US00RE46723E

(19) United States
(12) Reissued Patent
Smith et al.

(10) Patent Number: US RE46,723 E
(45) Date of Reissued Patent: *Feb. 20, 2018

(54) ALIGNMENT RESTORATION DEVICE FOR LOAD TRANSPORTING APPARATUS

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: This patent is subject to a terminal disclaimer.

(21) Appl. No.: 15/141,587

(22) Filed: Apr. 28, 2016

Related U.S. Patent Documents

Reissue of:
(64) Patent No.: 9,004,203
Issued: Apr. 14, 2015
Appl. No.: 14/028,150
Filed: Sep. 16, 2013

U.S. Applications:
(63) Continuation of application No. 13/711,269, filed on Dec. 11, 2012, now Pat. No. 8,561,733.
(Continued)

(51) Int. Cl.
*B62D 51/06* (2006.01)
*B62D 57/02* (2006.01)
(Continued)

(52) U.S. Cl.
CPC ..... *B62D 57/032* (2013.01); *B62D 57/02* (2013.01); *E21B 15/003* (2013.01)

(58) Field of Classification Search
CPC ..... B62D 57/02; B62D 57/032; E21B 15/003
(Continued)

(56) References Cited

U.S. PATENT DOCUMENTS 1,001,299 A 8/1911 Page
1,242,635 A 10/1917 Anderson
(Continued)

FOREIGN PATENT DOCUMENTS

CH 359422 1/1962
CN 1515477 7/2003
(Continued)

OTHER PUBLICATIONS

Notice of Pending Litigation Under 37 CFR 1.56 Pursuant to Granted Request for Prioritized Examination Under 37 CFR 1.102 € (1), Jun. 28, 2016.
(Continued)

*Primary Examiner* — William Doerrler
(74) *Attorney, Agent, or Firm* — Schwabe Williamson & Wyatt

(57) ABSTRACT

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

28 Claims, 17 Drawing Sheets

Related U.S. Application Data

(60) Provisional application No. 61/576,657, filed on Dec. 16, 2011.

(51) Int. Cl.
*B62D 57/032* (2006.01)
*E21B 15/00* (2006.01)

(58) Field of Classification Search
USPC ..... 180/8.1, 8.5, 8.6
See application file for complete search history.

(56) References Cited

U.S. PATENT DOCUMENTS 1,289,207 A 12/1918 Leach
1,429,551 A 9/1922 Anderson
1,615,055 A 1/1927 Turner
1,627,249 A 5/1927 Page
1,692,121 A 11/1928 Grant
1,879,446 A 2/1931 Page
1,914,692 A 6/1933 Kakaska
1,915,134 A 6/1933 MacPherson
2,132,184 A 10/1937 Poche
2,164,120 A 6/1939 Page
2,247,782 A 7/1941 Martinson
2,259,200 A 10/1941 Cameron et al.
2,290,118 A 7/1942 Page
2,380,431 A 7/1945 Harding
2,399,375 A 4/1946 Mullins
2,452,632 A 11/1948 McLeod
2,541,496 A 2/1951 Busick, Jr.
2,616,677 A 11/1952 Compton
2,660,253 A 11/1953 Davidson
2,660,449 A 11/1953 MacPherson
2,692,770 A 10/1954 Nallinger et al.
2,914,127 A 8/1955 Ricourd
2,777,528 A 1/1957 Jourdain
2,901,240 A 8/1959 Fikse
2,935,309 A 5/1960 McCarthy
2,942,676 A * 6/1960 Kraus ..... 180/8.5
3,078,941 A 2/1963 Baron
3,113,661 A 12/1963 Linke et al.
3,135,345 A 6/1964 Scruggs
3,150,733 A 9/1964 Goebel
3,249,168 A 5/1966 Klein
3,255,836 A 6/1966 Hoppmann et al.
3,265,145 A 8/1966 Beitzel
3,334,849 A 8/1967 Bronder
3,362,553 A 1/1968 Weinmann
3,375,892 A 4/1968 Kraschnewski et al.
3,446,301 A 5/1969 Thomas
3,448,994 A 6/1969 King et al.
3,490,786 A 1/1970 Ravenel
3,493,064 A 2/1970 Wilson
3,512,597 A * 5/1970 Baron ..... 180/8.5
3,527,313 A 9/1970 Reimann
3,528,341 A 9/1970 Rieschel
3,576,225 A * 4/1971 Chambers ..... 180/8.5
3,612,201 A 10/1971 Smith
3,638,747 A * 2/1972 Althoff ..... 180/8.5
3,674,103 A 7/1972 Kiekhaefer
3,734,220 A 5/1973 Smith
3,754,361 A 8/1973 Branham
3,765,499 A 10/1973 Harmala
3,767,064 A 10/1973 Lutz
3,767,224 A 10/1973 Schneeweiss
3,796,276 A 3/1974 Maeda
3,807,519 A * 4/1974 Patch ..... 180/8.5
3,853,196 A * 12/1974 Guest ..... 180/8.5
3,866,425 A 2/1975 Morrice
3,921,739 A * 11/1975 Rich et al. ..... 180/8.5
3,951,225 A 4/1976 Schewenk
4,014,399 A * 3/1977 Ruder ..... 180/8.5
4,021,978 A 5/1977 Busse
4,048,936 A 9/1977 Uchizono
RE29,541 E 2/1978 Russell
4,135,340 A 1/1979 Cox
4,206,935 A 6/1980 Sheppard et al.
4,252,204 A 2/1981 Bishop
4,290,495 A 9/1981 Eiliston
4,296,820 A 10/1981 Loftis
4,324,077 A 4/1982 Woolslayer
4,324,302 A 4/1982 Rabinovitch
4,334,587 A 6/1982 Rangaswamy
4,371,041 A 2/1983 Becker
4,375,892 A 3/1983 Jenkins
4,405,019 A 9/1983 Frisbee
4,406,339 A 9/1983 Spencer
4,423,560 A 1/1984 Rivinius
4,489,954 A 12/1984 Yasui et al.
4,491,449 A 1/1985 Hawkins
4,555,032 A 11/1985 Mick
4,655,467 A 4/1987 Kitzmiller et al.
4,759,414 A 7/1988 Willis
4,821,816 A 4/1989 Willis
4,823,870 A 4/1989 Sorokan
4,831,795 A 5/1989 Sorokan
4,842,298 A 6/1989 Jarvis
5,015,147 A 5/1991 Taylor
5,178,406 A 1/1993 Reynolds
5,245,882 A 9/1993 Kallenberger
5,248,005 A 9/1993 Mochizuki
5,398,396 A 3/1995 Sanders
5,492,436 A 2/1996 Suksumake
5,575,346 A 11/1996 Yberle
5,600,905 A 2/1997 Kallenberger
5,603,174 A 2/1997 Kallenberger
5,613,444 A 3/1997 Ahmadian et al.
5,749,596 A 5/1998 Jensen et al.
5,794,723 A 8/1998 Caneer
5,921,336 A 7/1999 Reed
6,089,583 A 7/2000 Taipale
6,202,774 B1 * 3/2001 Claassen et al. ..... 180/8.5
6,203,247 B1 3/2001 Schellstede
6,345,831 B1 2/2002 deMarcellus
6,474,926 B2 11/2002 Weiss
6,554,145 B1 4/2003 Fantuzzi
6,554,305 B2 4/2003 Fulks
6,581,525 B2 * 6/2003 Smith ..... 104/96
6,612,781 B1 9/2003 Jackson
6,651,991 B2 11/2003 Carlstedt et al.
6,820,887 B1 11/2004 Riggle
6,857,483 B1 2/2005 Dirks
6,962,030 B2 11/2005 Conn
7,182,163 B1 2/2007 Gipson
7,308,953 B2 12/2007 Barnes
7,357,616 B2 4/2008 Andrews
7,681,674 B1 3/2010 Barnes et al.
7,806,207 B1 10/2010 Barnes et al.
7,819,209 B1 10/2010 Bezner
7,882,915 B1 * 2/2011 Wishart ..... 180/203
8,019,472 B2 9/2011 Montero
8,051,930 B1 11/2011 Barnes et al.
8,250,816 B2 8/2012 Donnally
8,468,753 B2 6/2013 Donnally
8,490,724 B2 * 7/2013 Smith et al. ..... B62D 57/02 180/8.6
8,490,727 B2 7/2013 Smith et al.
8,556,003 B2 10/2013 Souchek
8,561,733 B2 * 10/2013 Smith et al. ..... B62D 57/02 180/8.1
8,573,334 B2 * 11/2013 Smith et al. ..... 180/8.5
8,646,549 B2 2/2014 Ledbetter
8,646,976 B2 2/2014 Stoik
8,839,892 B2 * 9/2014 Smith et al. ..... B62D 57/02 180/8.6
8,887,800 B2 11/2014 Havinga
9,004,203 B2 4/2015 Smith
9,045,178 B2 6/2015 Smith
9,463,833 B2 10/2016 Smith et al.
2004/0211598 A1 10/2004 Palidis
2004/0240973 A1 12/2004 Andrews
2006/0027373 A1 2/2006 Carriere
2006/0213653 A1 9/2006 Cunningham

(56) References Cited

U.S. PATENT DOCUMENTS

| | | | | |
|---|---|---|---|---|
| 2009/0000218 | A1 | 1/2009 | Lee | |
| 2009/0188677 | A1 | 7/2009 | Ditta | |
| 2009/0200856 | A1 | 8/2009 | Chehade | |
| 2009/0283324 | A1 | 11/2009 | Konduc | |
| 2010/0252395 | A1 | 10/2010 | Lehtonen | |
| 2011/0072737 | A1 | 3/2011 | Wasterval | |
| 2011/0114386 | A1 | 5/2011 | Souchek | |
| 2012/0219242 | A1 | 8/2012 | Stoik | |
| 2013/0153309 | A1 | 6/2013 | Smith et al. | |
| 2013/0156538 | A1 | 6/2013 | Smith et al. | |
| 2013/0156539 | A1 | 6/2013 | Smith et al. | |
| 2013/0277124 | A1 | 10/2013 | Smith et al. | |
| 2014/0014417 | A1* | 1/2014 | Smith et al. | 180/8.1 |
| 2014/0054097 | A1* | 2/2014 | Bryant et al. | 180/8.1 |
| 2014/0158342 | A1 | 6/2014 | Smith | |
| 2014/0161581 | A1* | 6/2014 | Smith et al. | 414/800 |
| 2017/0021880 | A1 | 1/2017 | Smith | |

FOREIGN PATENT DOCUMENTS

| | | |
|---|---|---|
| DE | 2418411 | 10/1975 |
| DE | 4107314 | 9/1992 |
| EP | 469182 | 10/1990 |
| EP | 469182 | 2/1992 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Defendants' Second Amended Answer, Affirmative Defenses, and Counterclaims to Plaintiff's Complaint for Patent Infringement, Jul. 12, 2016, p. 9, Sections 15-18.

Defendants' First Amended Answer, Affirmative Defenses, and Counterclaims to Plaintiff's Complaint for Patent Infringement, Jun. 27, 2016, p. 9, Section 16.

Defendants' Answer, Affirmative Defenses and Counterclaims to Plaintiff's Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Schwabe Williamson & Wyatt, PC "Listing of Related Cases", dated Jun. 28, 2016; 1 page.

Defendant Hydraulic Systems, Inc.'s Preliminary Invalidity Contentions, Nov. 18, 2016, pp. 1-6.

Defendant Hydraulic Systems, Inc.'s Supplemental Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet.

Stolowitz Ford Cowger L.L.P, "Listing of Related Cases", Sep. 16, 2013, 1 page.

* cited by examiner

ALIGNMENT RESTORATION DEVICE FOR LOAD TRANSPORTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation of U.S. patent application Ser. No. 13/711,269, filed Dec. 11, 2012, now U.S. Pat. No. 8,561,733, issued Oct. 22, 2013, entitled ALIGNMENT RESTORATION DEVICE FOR LOAD TRANSPORTING APPARATUS, which claims priority to U.S. Provisional Application No. 61/576,657, filed Dec. 16, 2011, entitled METHOD AND APPARATUS FOR TRANSPORTING A LOAD, the contents of which are hereby incorporated by reference. This application is related to U.S. patent application Ser. No. 13/711,193, filed Dec. 11, 2012, now U.S. Pat. No. 8,573,334, issued Nov. 5, 2013, entitled ROTATION DEVICE FOR LOAD TRANSPORTING APPARATUS, the contents of which are hereby incorporated by reference. This application is also related to U.S. patent application Ser. No. 13,711,315, filed Dec. 11, 2012, now U.S. Pat. No. 8,490,724, issued Jul. 23, 2013, entitled CENTERING DEVICE FOR LOAD TRANSPORTING APPARATUS, the contents of which are hereby incorporated by reference.

FIELD OF THE INVENTION

This disclosure relates generally to apparatuses for transporting a load, and more particularly to apparatuses for moving heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. This is, movement of the heavy load is restricted in the walking device disclosed in the '525 patent to only particular directions, which can make fine tuning of the position of the heavy load difficult.

SUMMARY

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
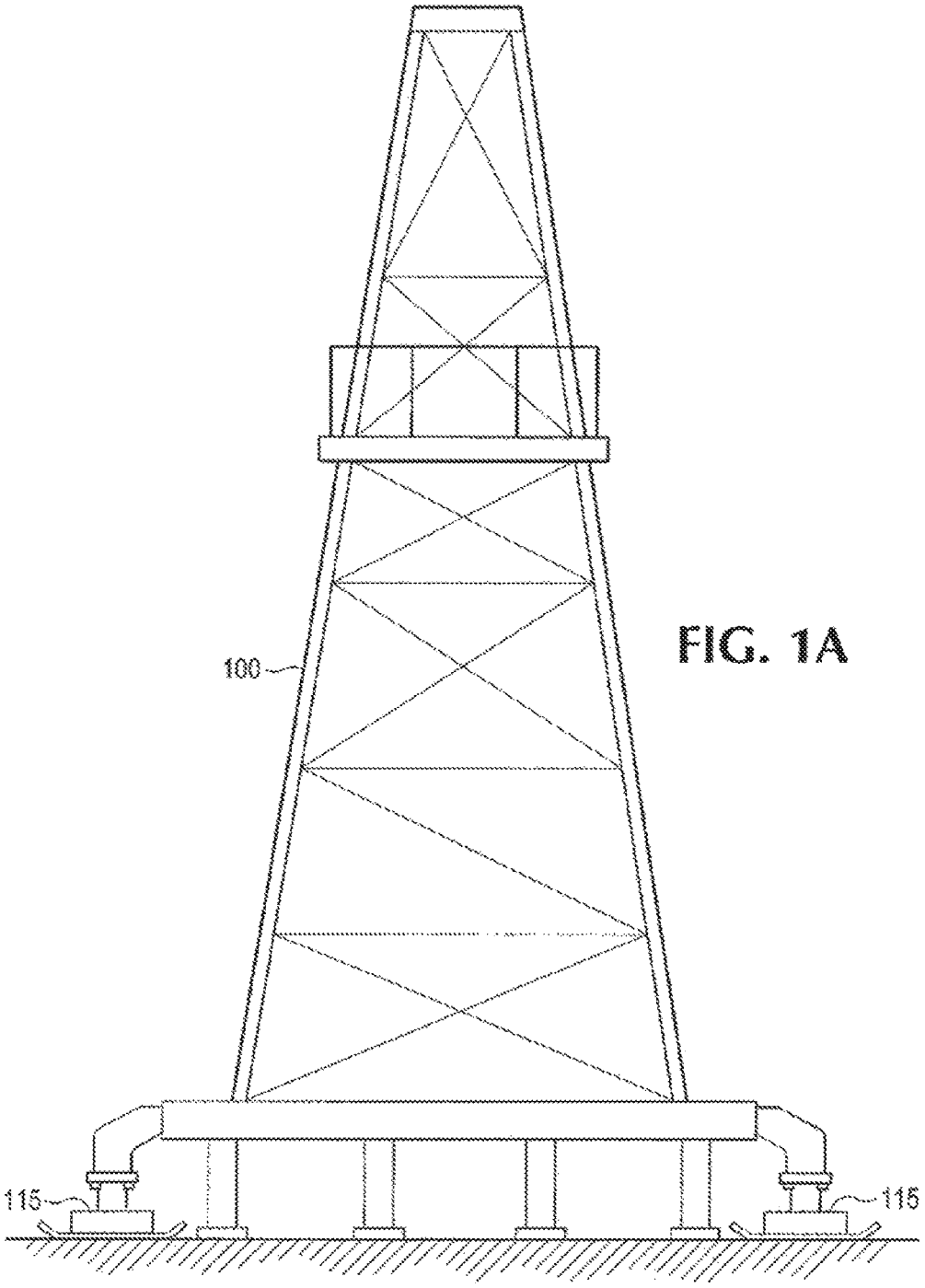
FIGS. 1A and 1B are diagrams of walking apparatuses attached to various loads according to embodiments of the invention.
Figure 1B:
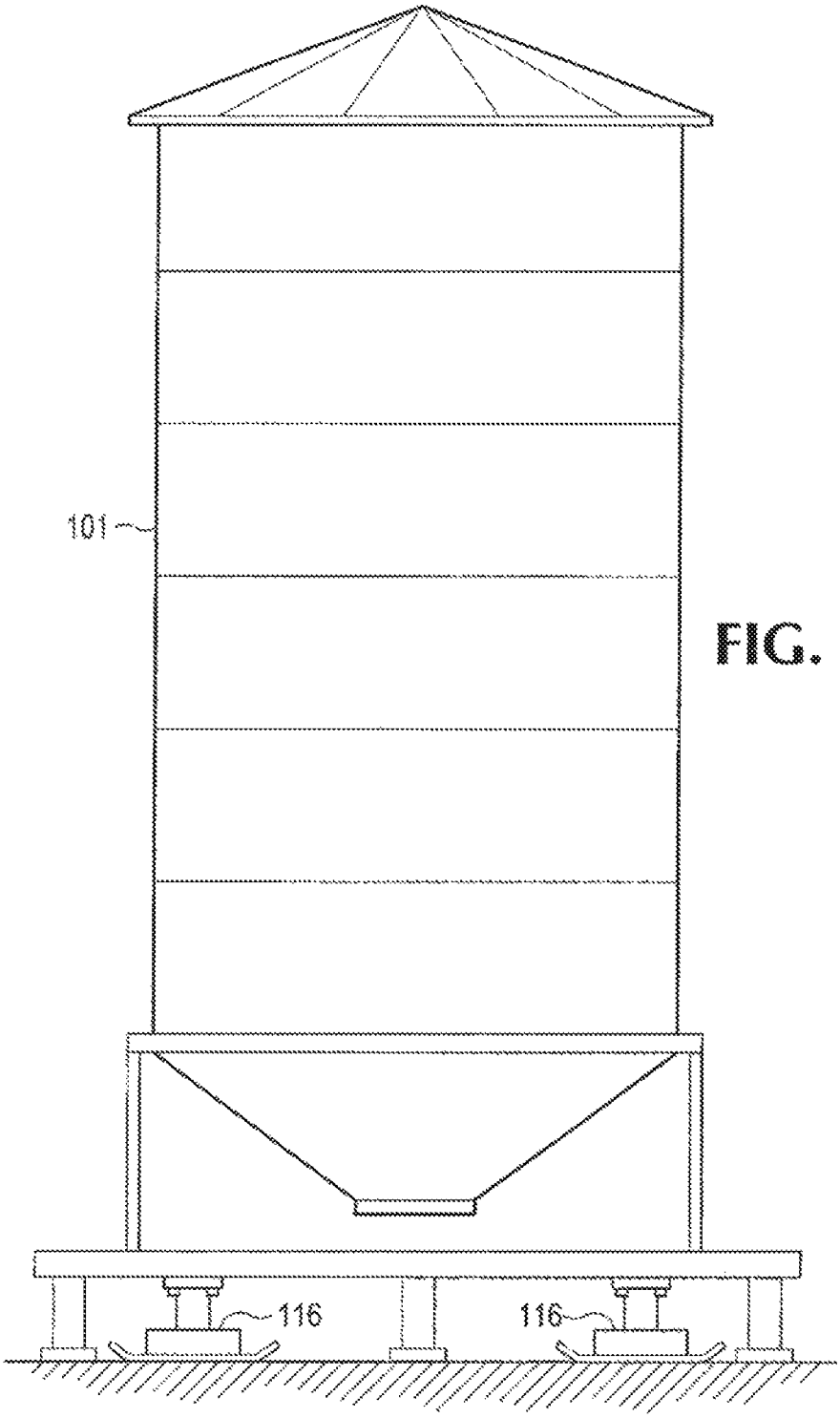

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
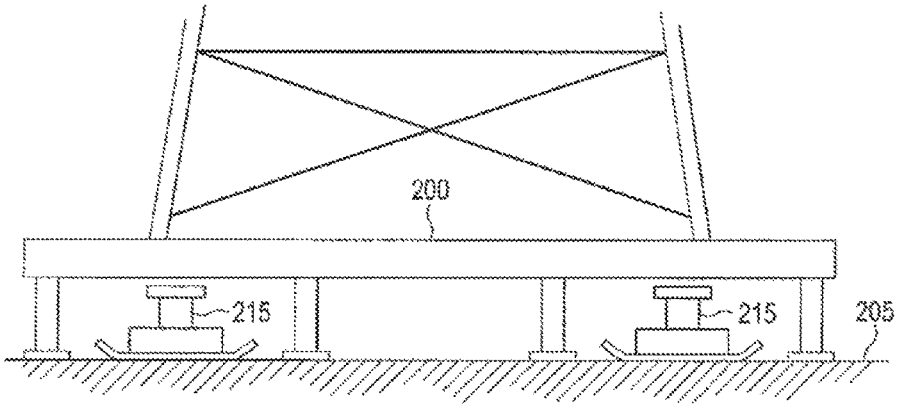
FIGS. 2A, 2B, 2C, 2D, 2E, and 2F are detail diagrams showing an example operational progression of walking apparatuses to move a load according to embodiments of the invention.
Figure 2B:
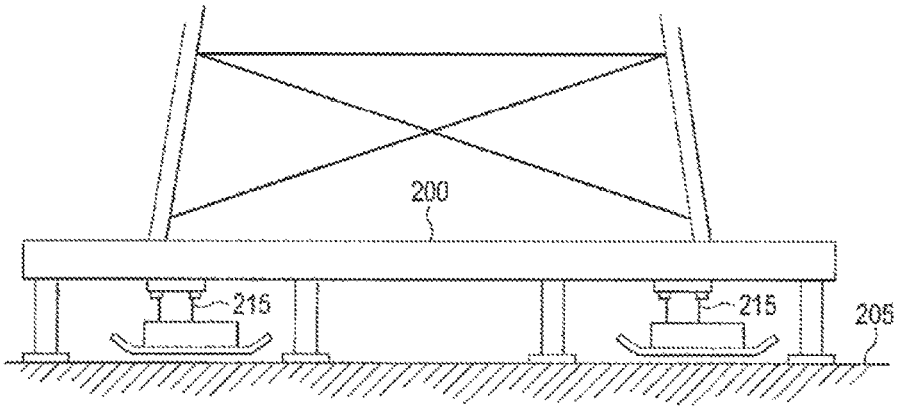
Figure 2C:
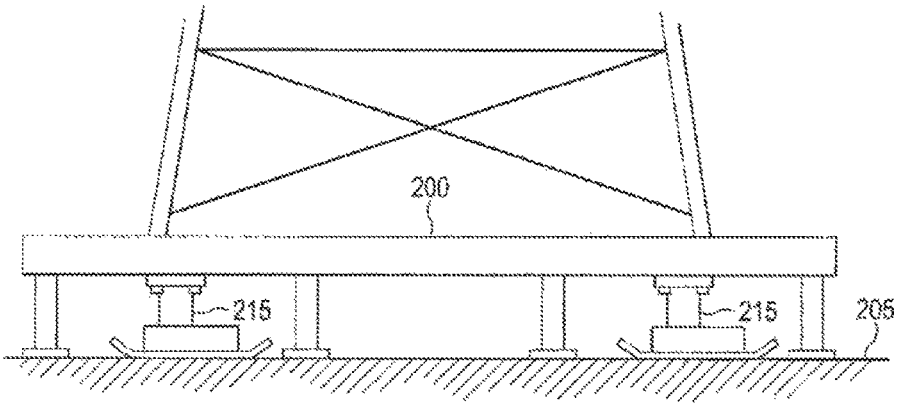

FIGS. 2A-2F provide an overview of an example operation of walking apparatuses to move a load according to embodiments of the invention. Referring to FIG. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
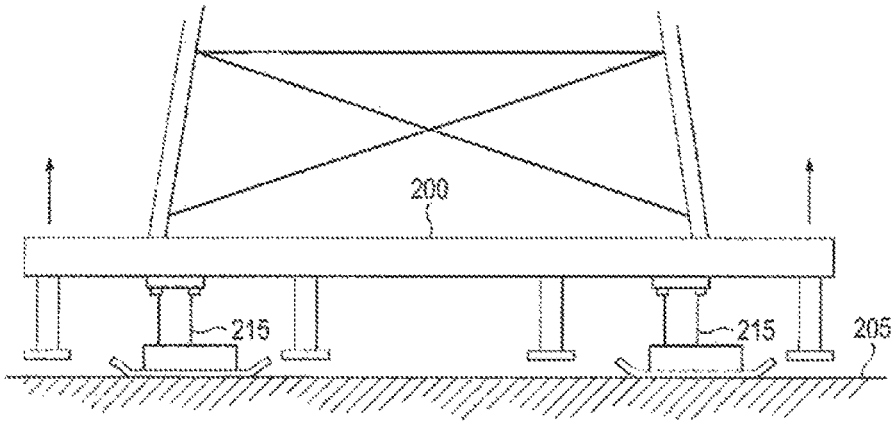

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
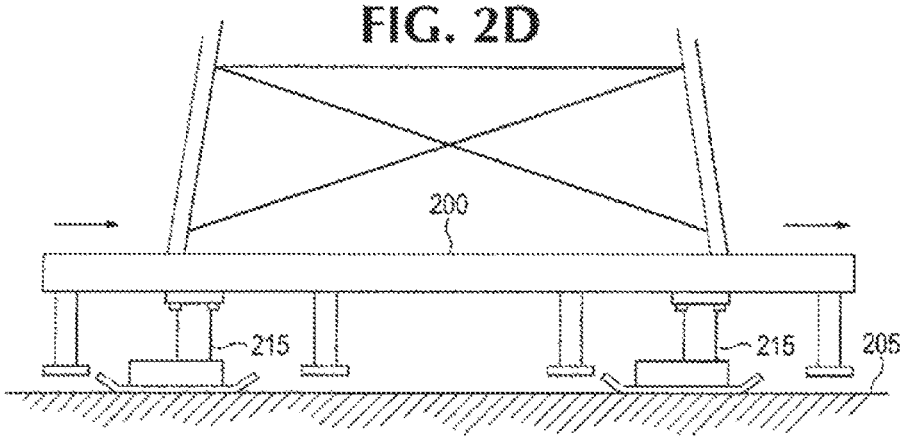
Figure 2F:
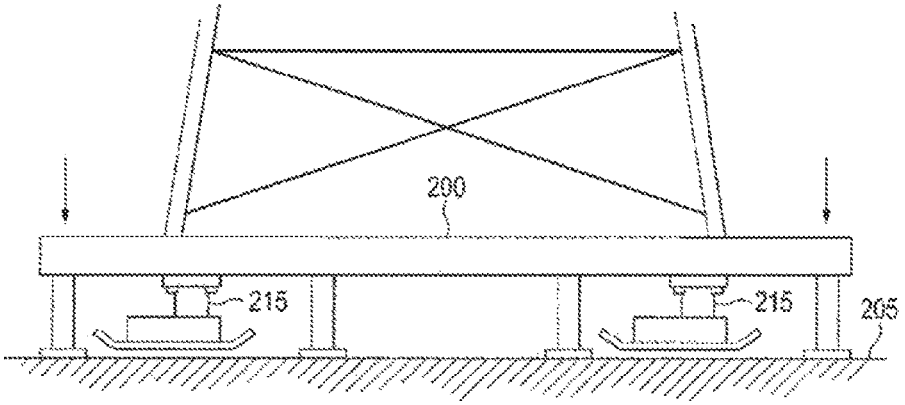

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2D to 2F.

Figure 3A:
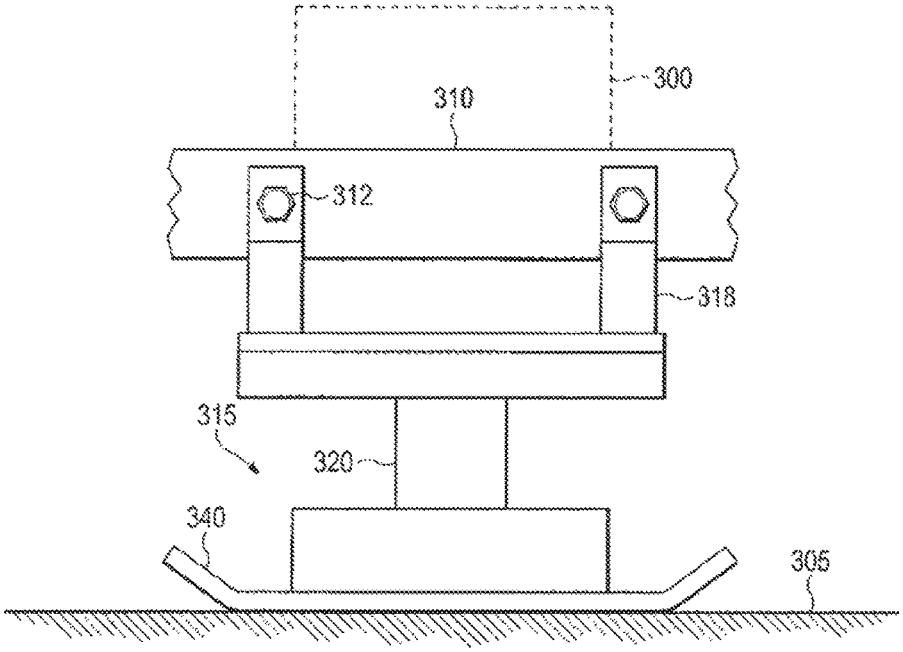
FIGS. 3A and 3B are diagrams illustrating example connection arrangements used to connect a walking apparatus to a load according to embodiments of the invention.
Figure 3B:
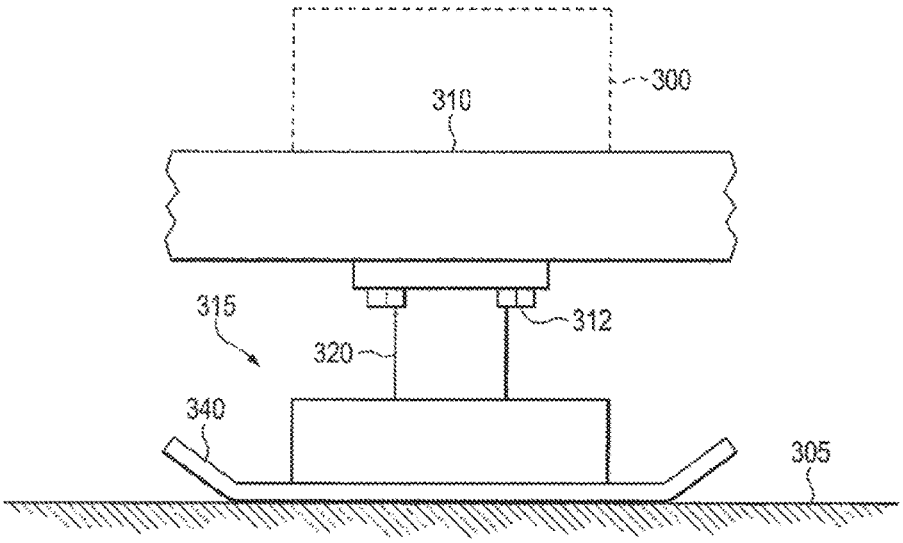

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
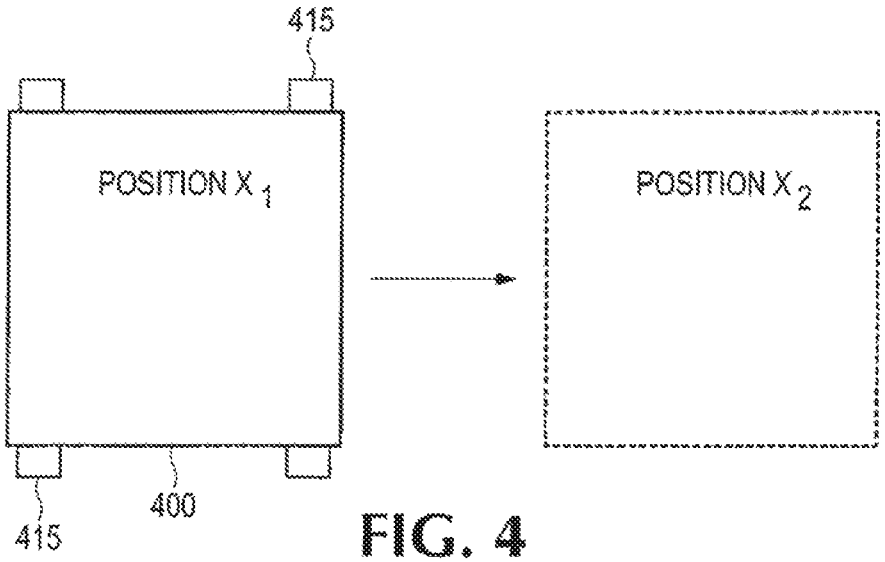
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
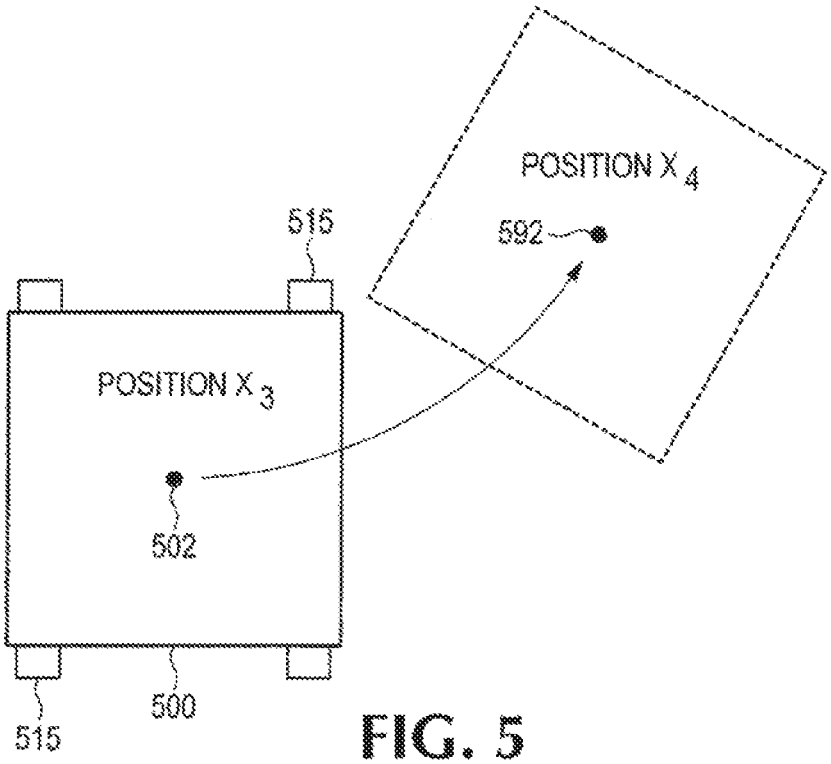
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6:
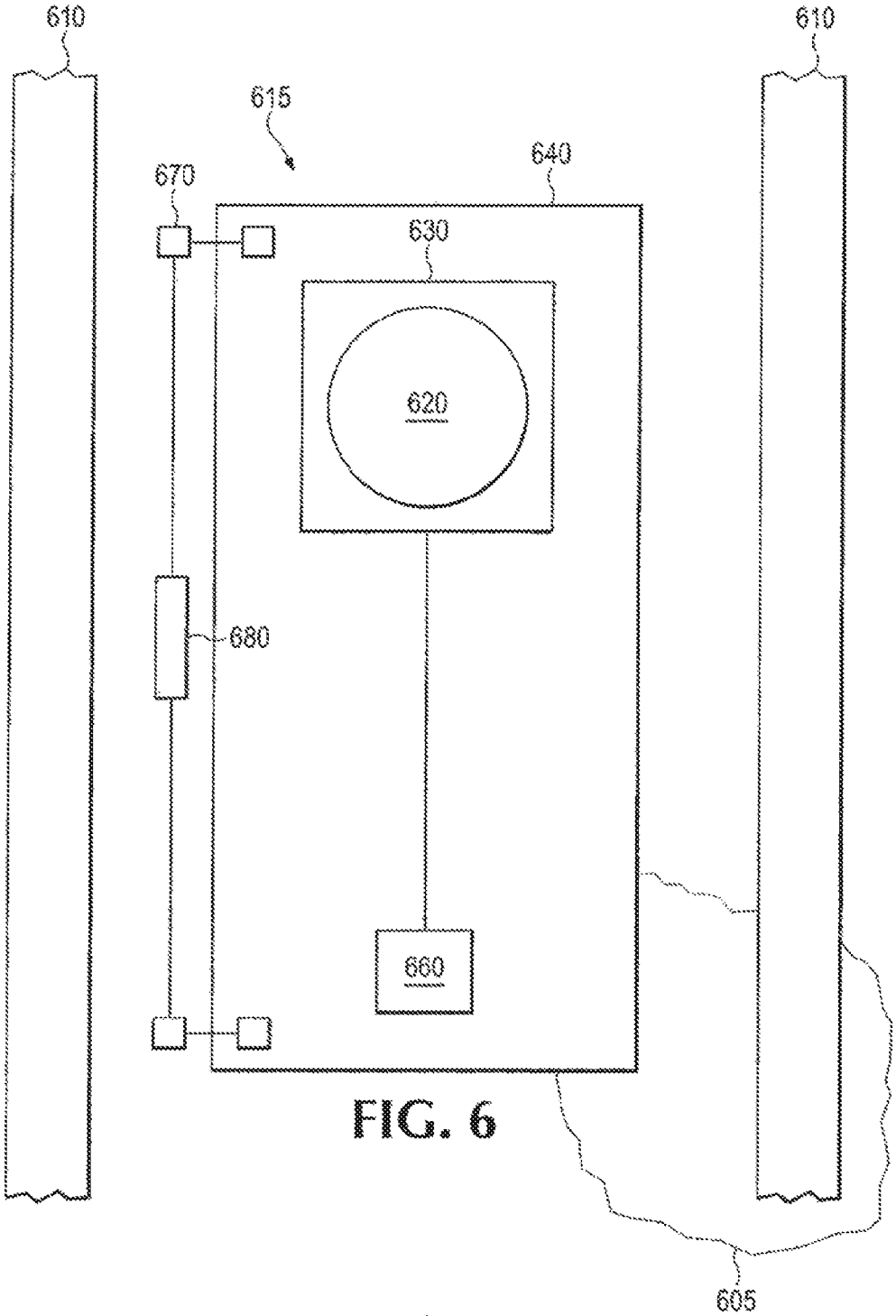
FIG. 6 is a schematic diagram of a top view of a walking apparatus according to embodiments of the invention.

FIG. 6 is a schematic diagram of a top view of a walking apparatus according to embodiments of the invention. Referring to FIG. 6, a load transporting apparatus 615 is configured to move a load (e.g., element 100 FIG. 1) over a base surface 605 in one or more incremental steps each including a load-movement phase and a recovery phase. The load transporting apparatus 615 includes a lift mechanism 620 structured to lift a load-bearing frame 610 supporting the load and a support foot 640 connected to the lift mechanism, the support foot structured to interface with the base surface 605. A roller assembly 630 is also coupled to the lift mechanism 620. A travel mechanism 660 is coupled to the roller assembly 630 and is structured to displace the roller assembly relative to the support foot 640. The load transporting apparatus also includes one or more linking devices 670 coupled to the support foot 640, and one or more biasing devices 680 coupled to the linking devices. The biasing devices 680 are structured to become activated during a load-movement phase when the roller assembly 630 is non-linearly displaced by the travel mechanism 660 relative to the support foot 640, and structured to return the support foot to an aligned position relative to the load-bearing frame 610 during a recovery phase. Here, the support foot 640 may be aligned with the load-bearing frame 610 when a longitudinal centerline of the support foot is parallel with a main beam of the load-bearing frame.

In these embodiments, the linking devices 670 are coupled to the biasing device 680 so that when the roller assembly 630 moves the load in a direction different than the orientation of the support foot 640, a deflection force is generated and/or stored as potential energy in the biasing device 680. This deflection force may be stored by deforming the biasing device 680 within the elastic region of a stress-strain curve associated with a material of the biasing device. For example, in embodiments where the biasing device 680 is a torsional bar, the deflection force transmitted to the biasing device during the non-linear displacement or movement may cause the torsional bar to twist.

The contact between the support foot 640 and the base or ground surface 605 creates substantial frictional forces that prevent the support foot from rotating or moving during the non-linear displacement. During the recovery phase of the walking cycle, the support foot 640 is raised above the base surface 605, which eliminates the frictional forces between the foot and the base surface. Once the support foot 640 begins to lose contact with the base surface 605, the potential energy stored in the biasing device 680 is used to return the support foot to an aligned position relative to the load-bearing frame 610. The alignment of the load-bearing frame 610 is dictated by the movement of the roller assembly 630 by the travel mechanism 660. Hence, when the roller assembly 630 is non-linearly displaced (e.g., moved such as shown in FIG. 5), the orientation of the load-bearing frame 610 becomes skewed from the orientation of the support foot 640. In the above example, where the biasing device 680 is a torsional bar, the support foot 640 is returned to a positioned aligned relative to the load-bearing frame 610 when the support foot loses contact with the base surface 605 and the torsion bar is allowed to "untwist," thereby re-orienting the support foot. In other words, the torsion bar is activated when an angular displacement occurs between the support foot 640 and the load-bearing frame 610, where the activation of the torsion bar including a torquing force being applied to the torsion bar.

Although a torsion bar is discussed as the biasing device 680, may different types of biasing devices may be used in other embodiments, such as leaf springs, coil springs, chains, hydraulic cylinders, motors, or any other type of device that can be deflected and/or store potential energy to apply a realignment force to the support foot 640.

Figure 7A:
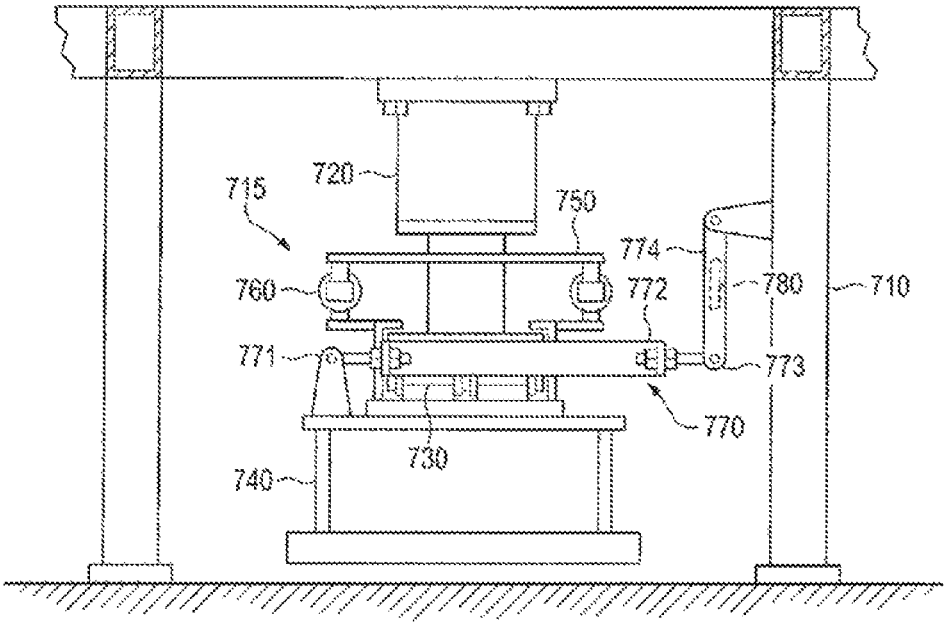
FIG. 7A is a side view of an example walking apparatus in a recovery position according to embodiments of the invention.
Figure 7B:
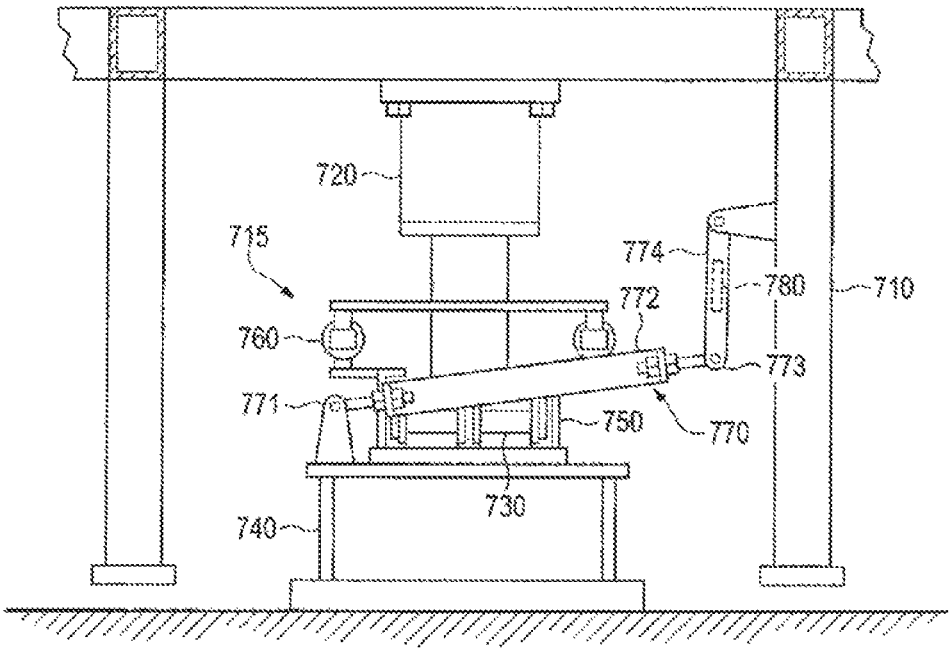
FIG. 7B is a side view of the example walking apparatus shown in FIG. 7A in a load-movement position according to embodiments of the invention.

FIG. 6 is presented in a schematic style view as many possible variations in the appearance and mechanical structure of the load transporting apparatus 615 exist. FIGS. 7A and 7B provide a more detailed view of one embodiment of a load transporting apparatus. FIG. 7A is a side view of an example walking apparatus in a recovery position according to embodiments of the invention. FIG. 7B is a side view of the example walking apparatus shown in FIG. 7A in a load-movement position according to embodiments of the invention. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710. Additional details regarding the structure of the load transporting apparatus 715 can be found in co-pending application Ser. No. 13/711,193, entitled ROTATION DEVICE FOR LOAD TRANSPORTING APPARATUS, the contents of which are herein incorporated by reference in their entirety.

The roller track 750 of the walking apparatus 715 may be coupled to the support foot 740 with a connection mechanism that allows the support foot to rotate relative to the roller track. Various connection mechanisms may be used to facilitate this relative rotation, such as a rotation pin described below in FIG. 9 and in the above mentioned application Ser. No. 13/711,193. In addition, the lift mechanism 720 may be structured to allow the roller assembly 730 to rotate about a substantially vertical axis in the center of a cylinder rod of the lift mechanism. That is, the roller assembly 730 may also be free to rotate around the cylinder rod of the lift mechanism 720.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain that rotate as well as roll on the roller track 750. That is, in some embodiments, the roller assembly 730 may include a WBOT series roller assembly from Hilman Rollers. Due to the configuration of the roller chain 730 of the roller assembly 730 and the tolerance between the roller assembly and the roller track 750 of the walking machine 715, the rollers of the roller chain will typically be engaged with the roller track during operation and use of the walking machine.

The roller assembly 730 may be secured to the lower end of the lift mechanism 720, with the roller assembly being captured within a U-shaped roller track 750. The roller assembly 730 may be configured to roll along the bottom inside surface of the roller track 750 as well as along the underside of the two upper flanges of the roller track. The one or more travel cylinders 760 may be coupled between the lift mechanism 720 and the roller track 750. Accordingly, as will be understood from the more detailed discussion below, these travel cylinders 760 permit for the translation of the roller track 750 relative to the lift mechanism 720 and vice versa. As discussed above, the roller track 750 may be secured to the elongate ground-engaging foot 740 (support foot) via a rotational pin (not shown in FIG. 7, but similar to element 955 of FIG. 9), which enables the roller track to be rotationally positioned relative to the foot for steering of the walking machine 715.

Figure 8A:
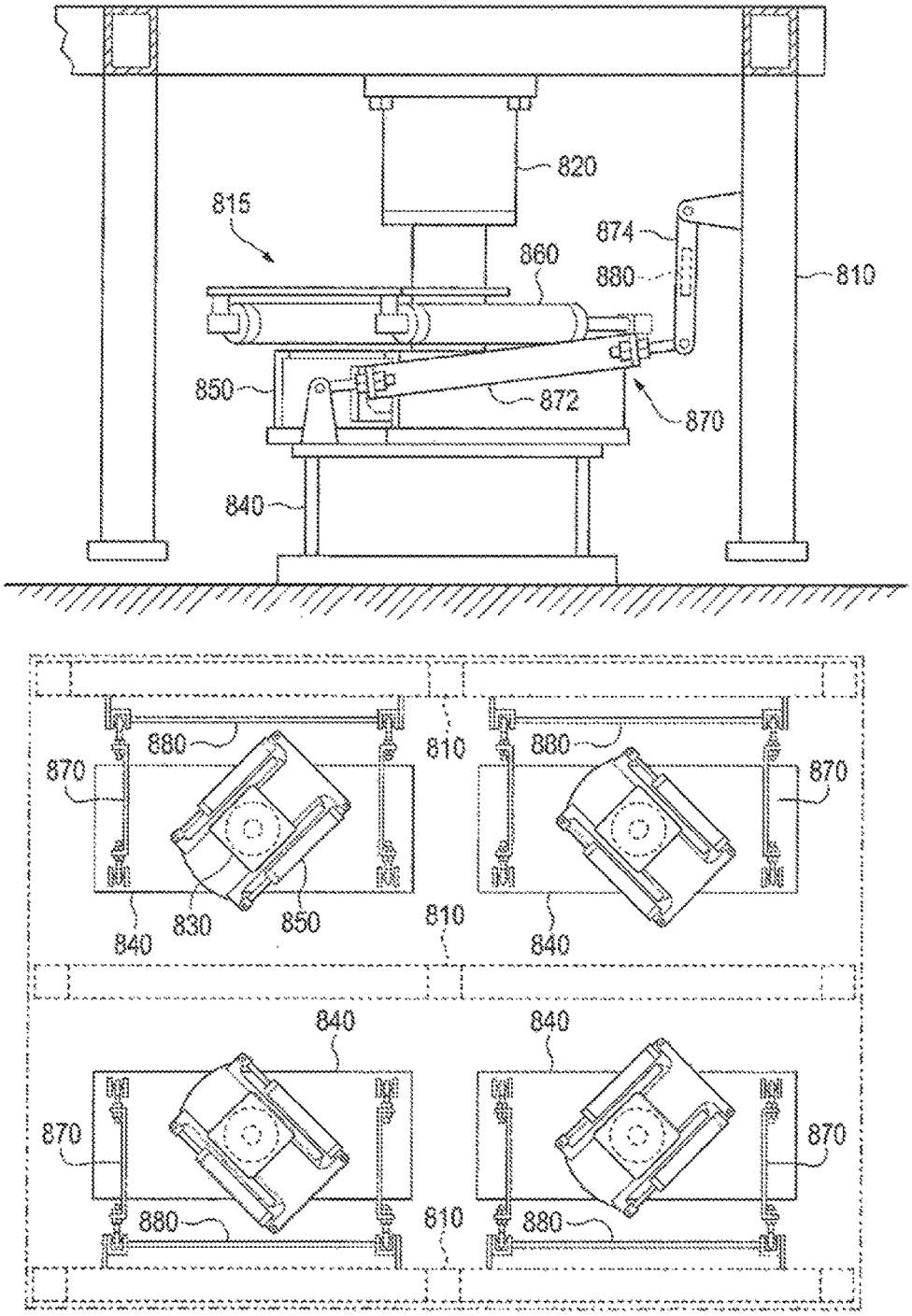
FIGS. 8A, 8B, 8C, and 8D are side and top views of walking apparatuses that illustrate an example operation progression of a load transporting system according to embodiments of the invention.

As shown in FIGS. 7A and 7B, a linking mechanism 770 is coupled to the support foot 740 and a biasing device 780 (shown more clearly as element 880) in FIG. 8A). In some embodiments, the linking mechanism 770 may include a first linking device attached at a first end of the support foot 740, where a second linking device connected to a second end of the support foot opposite of the first end of the first support foot (such as shown in FIGS. 6 and 8A). The biasing device 780 may be coupled between the first and second linking devices of the linking mechanism 770.

In the embodiments shown in FIGS. 7A and 7B, the linking mechanism 770 includes a first linking rod 772 connected to the support foot 740 with a first pivot joint 771. In some embodiments, the first pivot joint 771 may be a spherical rod end bearing configured to allow movement in three degrees of freedom. In other embodiments, the first pivot joint 771 may be another type of joint, such as a hinge joint, that restricts movement to one or two degrees of freedom.

The linking mechanism 770 may also include a second linking rod 774 connected to the first linking rod 772 with a second pivot joint 773. As with the first pivot joint 771, the second pivot joint 773 may be a spherical rod end bearing, or any other type of joint. The second linking rod 774 may further be connected to the load-bearing frame 710. In other embodiments, the one or more biasing devices 780 are also coupled to the load-bearing frame 710.

As shown in FIGS. 7A and 7B, the first and second pivot joints 771, 773 allow linking mechanism 770 to move vertically with the support foot 740 without deflecting or otherwise activating the biasing device 780.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the movement of the roller assembly 730 deviates from a set direction of travel, and structured to return the support foot to a centered position relative to the support foot 740 during a recovery phase.

FIGS. 8A, 8B, 8C, and 8D are side and top views of walking apparatuses that illustrate an example operation progression of a load transporting system according to embodiments of the invention. Here, FIGS. 8A-8C may show a load-movement phase of a walking cycle, while FIG. 8D may show a recovery phase of a walking cycle, where the walking apparatus is in a spin steering mode.

Referring to FIG. 8A, a walking apparatus includes a support foot 840 positioned on a base surface 805 and connected to roller track 850. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. A linking device 870 includes a first linking member 872 that is connected to the support foot, and a second linking member 874 that connects the first linking member to the load-bearing frame 810. A biasing device 880 is also connected to the linking device 870, and structured to become deflected or activated during a non-linear movement of the roller assembly 830 relative to the support foot 840. As shown in FIG. 8A, the walking apparatus 815 is in an initial position of a walking cycle in a spin steering mode. The roller tracks 850 of each walking apparatus 815 are oriented in a desired direction of travel. Here, in this first step of making a spin movement, the lift mechanisms 820 are activated to lift the load-bearing frame 810 (and load) above the base surface.

Figure 8B:
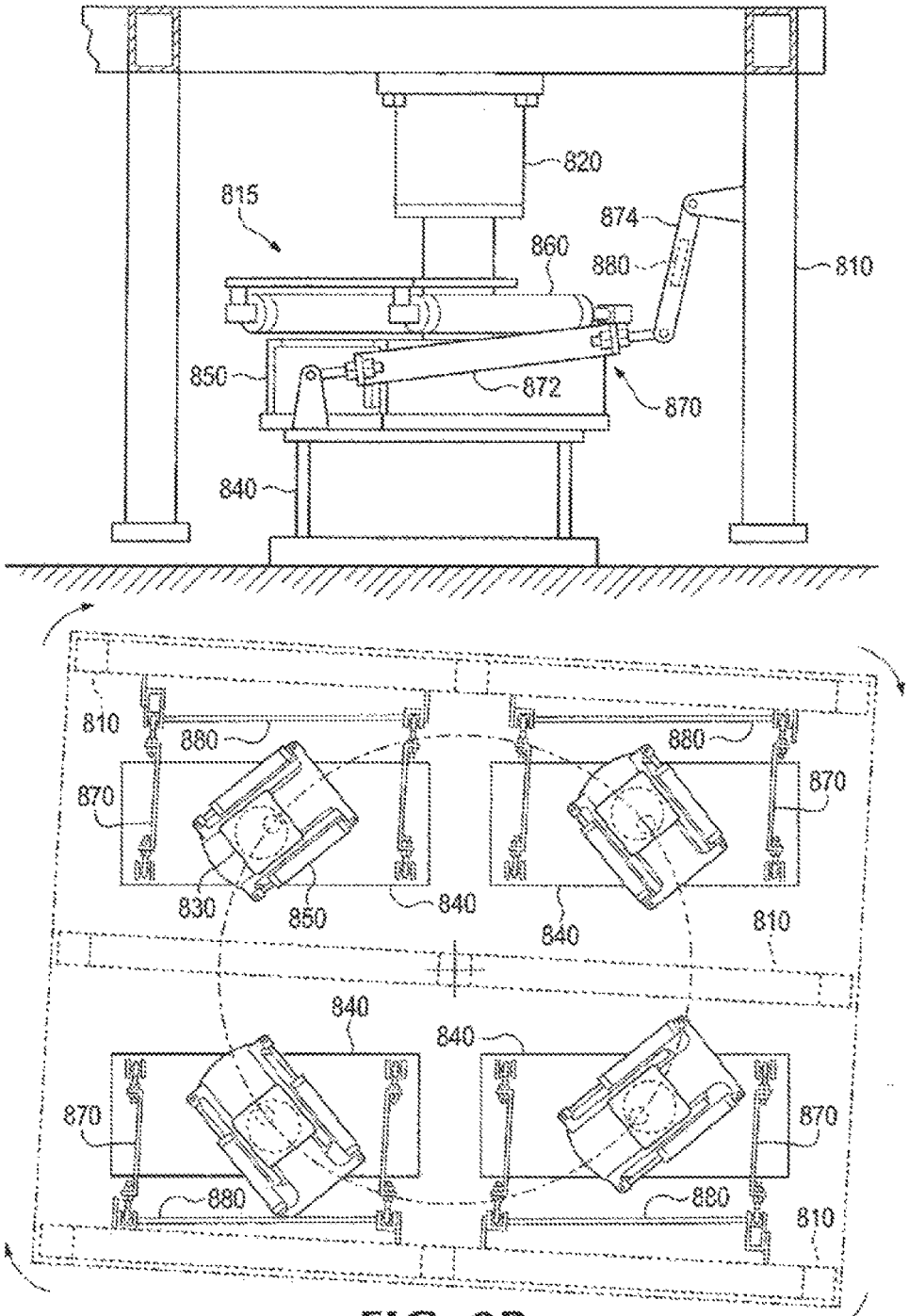

Referring to FIG. 8B, a step in a walking motion of the walking machine is illustrated. Specifically, as indicated by the arrows showing rotation of the load-bearing frame 810, the travel mechanism 860 is activated to displace the roller assembly 830 relative to the roller track 850 as shown. In this second step the walking system is moved in a circular or spin direction. Here, the travel cylinders of the travel mechanism 860 are actuated and the load-bearing frame 810 moves to a new angle. The support feet 840 are on the support surface and an angle of displacement occurs between the load-bearing frame 810 and the support feet. This non-linear movement or angular displacement causes an angular change in the biasing device 880. In embodiments where the biasing device 880 is a torsion bar, the resulting torque on the torsion bar causes the part of the linking device 870 to be in compression and causes another part of the linking device to be in tension.

Figure 8C:
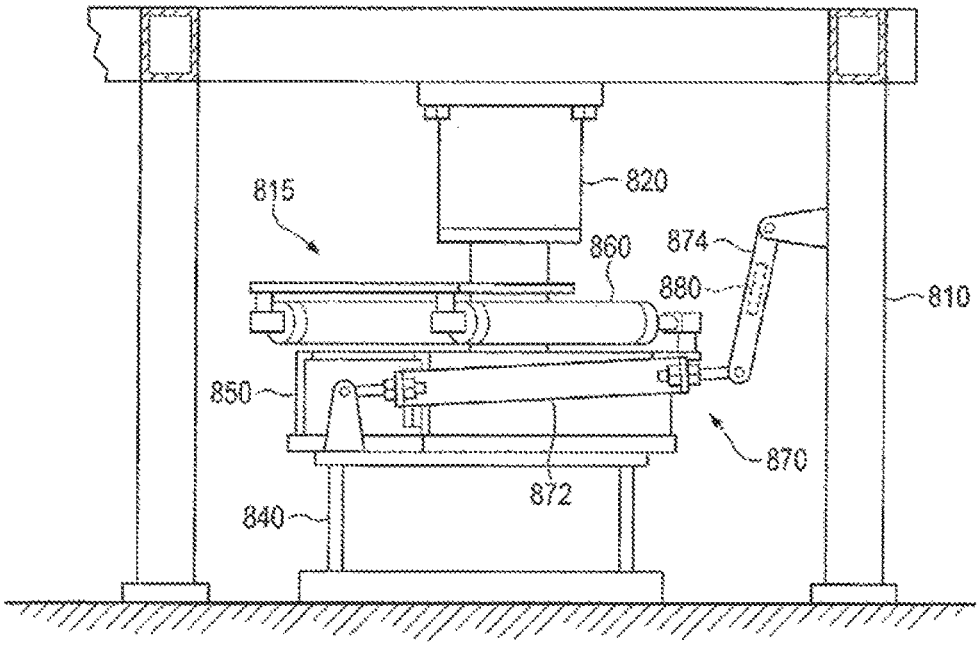
Figure 8C:
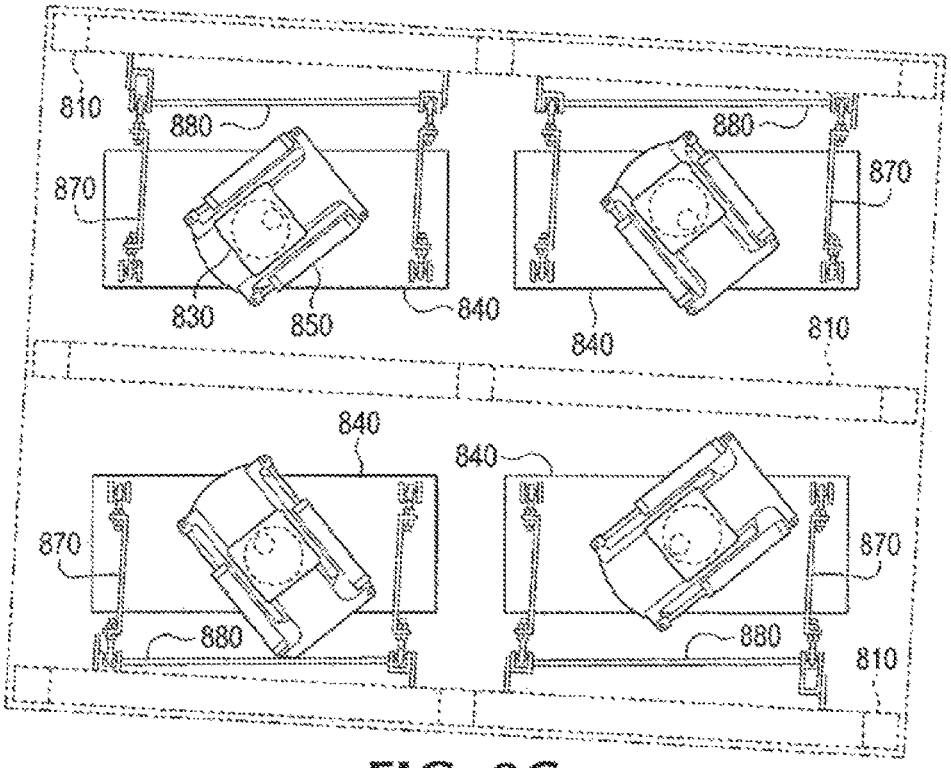

Referring to FIG. 8C, the travel mechanism 860 has finished moving the roller assembly 830 and load-bearing frame 810. Additionally, the lift mechanism 820 has been activated to lower the load and load-bearing frame 810. Here, the load-bearing frame 810 has just contacted the ground surface. However, the support foot 840 is still positioned on the ground surface as well. Hence, the biasing devices 880 are still in a deflected, activated, or biased state.

Figure 8D:
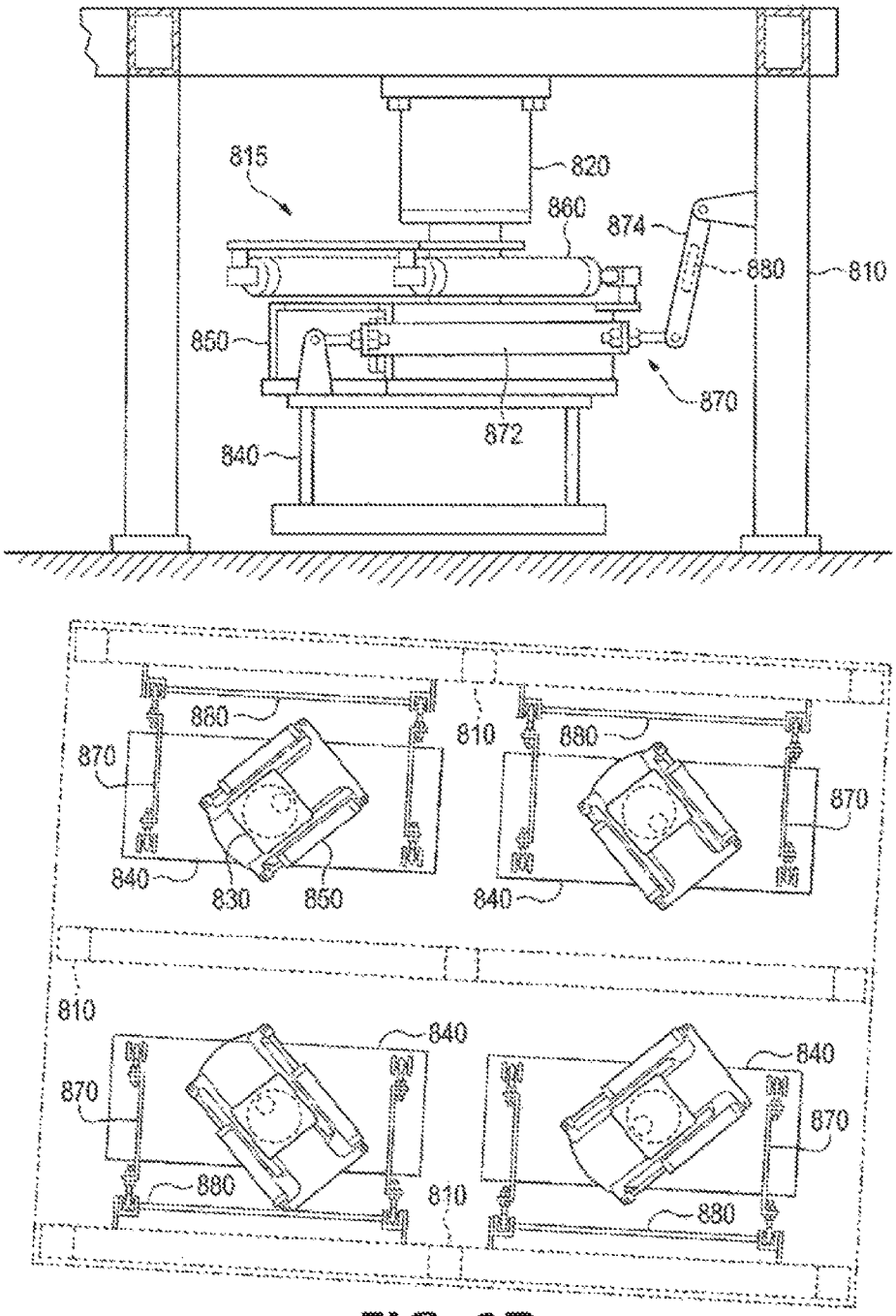

Referring to FIG. 8D, the lift mechanism 820 is continued to be operated such that the support foot 840 loses contact with the ground surface. As soon as this connection between the support foot 840 and the ground surface disappears, the biasing device 880 causes the support foot to "snap" back into alignment with the load-bearing frame 810 as shown.

Figure 9A:
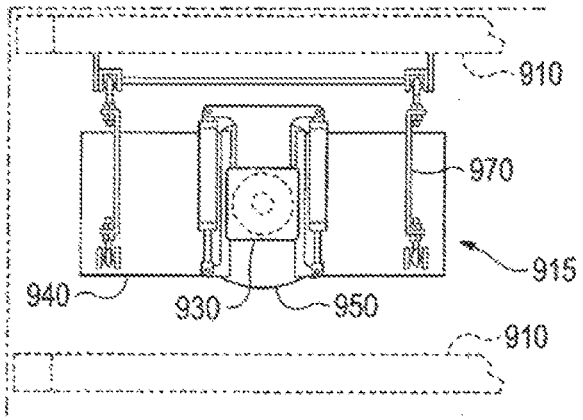
FIG. 9A is a top view of a walking apparatus in a perpendicular orientation according to embodiments of the invention.
Figure 9B:
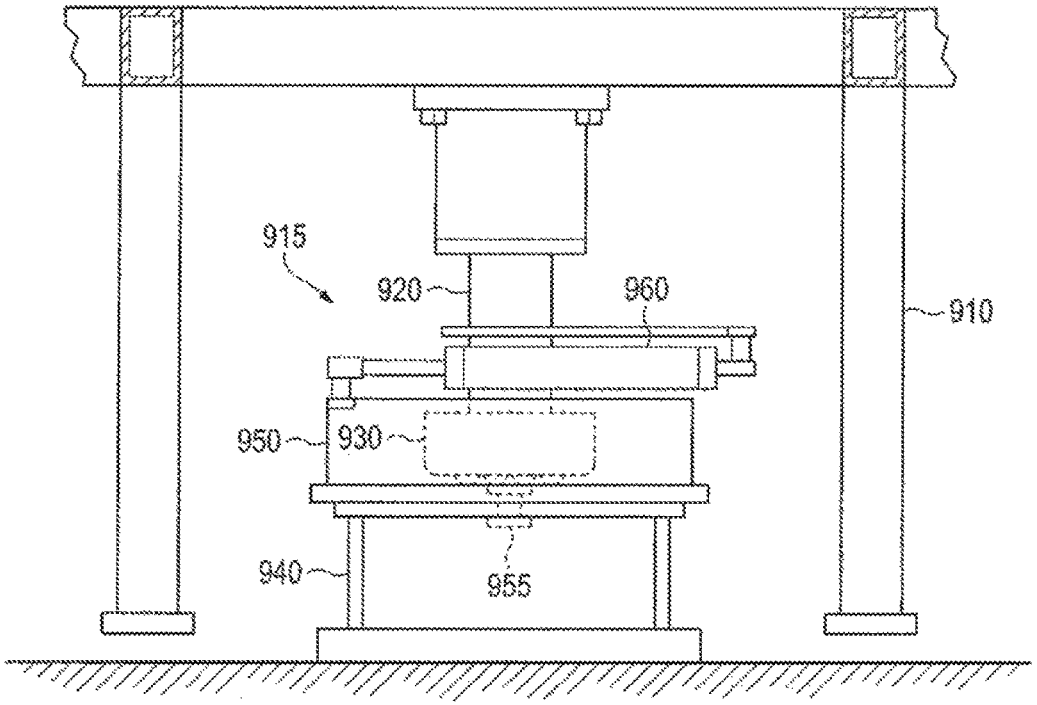
FIG. 9B is a side view of the walking apparatus shown in FIG. 9A in a load-movement position according to embodiments of the invention.
Figure 9C:
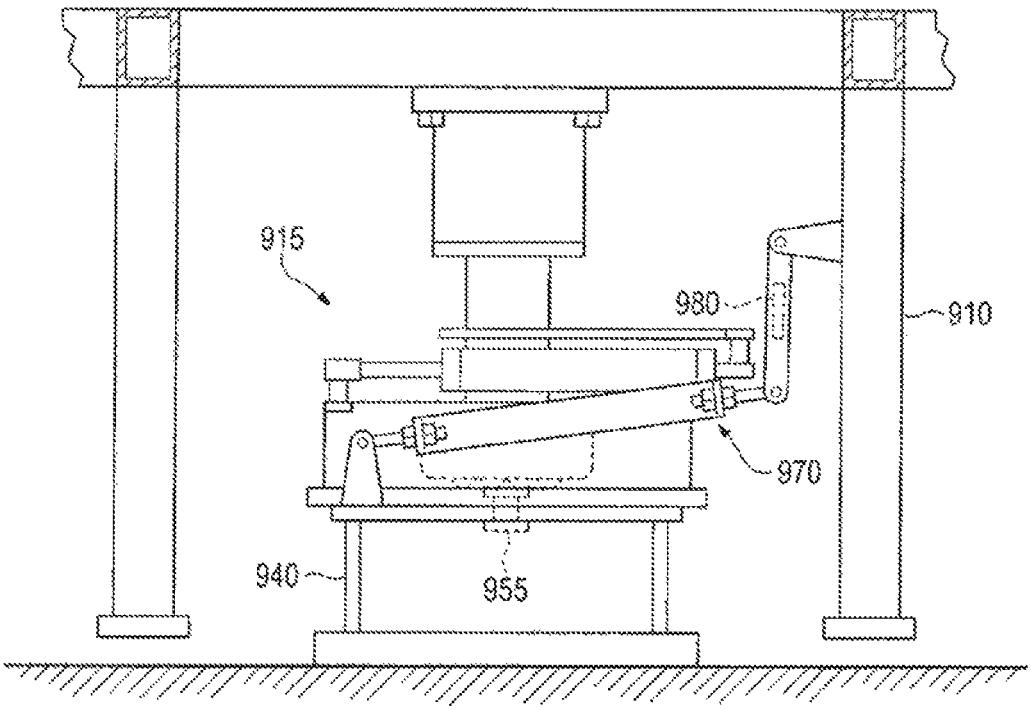
FIG. 9C is a side view of the walking apparatus shown in FIG. 9A in a recovery position according to embodiments of the invention.

FIGS. 9A-9C illustrate another embodiment of a walking apparatus. Here, FIG. 9A is a top view of a walking apparatus in a perpendicular orientation according to embodiments of the invention. FIG. 9B is a side view of the walking apparatus shown in FIG. 9A in a load-movement position where the linking devices have been removed for clarity sake. FIG. 9C is a side view of the walking apparatus shown in FIG. 9A in a recovery position with the linking devices added back in for reference purposes.

Referring to FIGS. 9A-9C, a walking apparatus 915 includes a lift mechanism 920 coupled to a load-bearing frame 910 that supports a load to be moved. The lift mechanism 920 is connected to a roller assembly 930 that is positioned on a roller track 950. The roller assembly 930 is moved relative to the roller track 950 with one or more travel mechanisms 960. The roller track 950 is coupled to a support foot 940 with a rotation pin 955, such as a king pin or other connection means that allows rotation of the roller track relative to the support foot as described in the rotation device application (Ser. No. 13/711,193) cited above. A linking device 970 is coupled between the support foot 940 and the load-bearing frame 910. A biasing device 980 is connected to the linking device 970. As described above, the biasing device 980 becomes deflected or activated when the roller assembly 930 moves in a non-linear direction relative to the support foot 940. For example, the roller track 950 is oriented perpendicular to the orientation of the support foot 940 in FIG. 9A. As the roller assembly 930 moves in the direction of the orientation of the roller track 950, the roller assembly and the load-bearing frame will also move substantially perpendicularly to the orientation of the support foot 940.

Here, the movement of the roller assembly 930 in this orientation does not activate or deflect the biasing device 980 because the linking devices 970 include joints that allow for the free movement of the roller assembly. The linking devices 970 may be structured in this manner because the orientation of the support foot 940 relative to the load-bearing frame 910 does not change.

Figure 10:
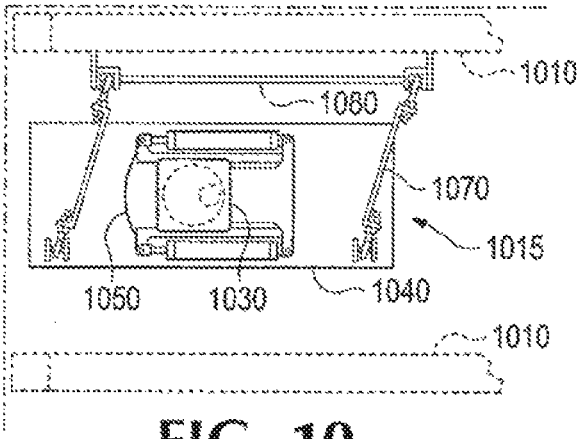
FIG. 10 is a top view of a walking apparatus after a load-movement phase of a walking cycle completed in a parallel direction according to embodiments of the invention.

This can also be seen when the roller assembly is moved parallel to the orientation direction of the support foot, as shown in FIG. 10. Referring to FIG. 10, a walking apparatus 1015 has just completed a load-movement phase of a walking cycle where a roller track 1050 is oriented in the same direction as a support foot 1040. Here, the roller assembly 1030 was moved to the right, along with the load-bearing frame 1010, as shown. The joints of the linking device 1070, however, allow the linking device to be angled from the linear movement without deflecting or otherwise activating the biasing device 1080. During a recovery phase, the load-bearing frame 1010 is lowered and the support foot 1040 is raised above a base surface. The support foot 1040 can then be repositioned relative to the roller assembly 1030 by activation of the transport mechanism 960 (FIG. 9B).

Some of the embodiments discussed above rely on the load-bearing frame as a reference point to realign the support feet during non-linear movements of the load. However, in other embodiments, other linking and biasing devices can be utilized to maintain alignment of the support feet. Some of these techniques are discussed below with respect to FIGS. 11 and 12A-12E.

Figure 11:
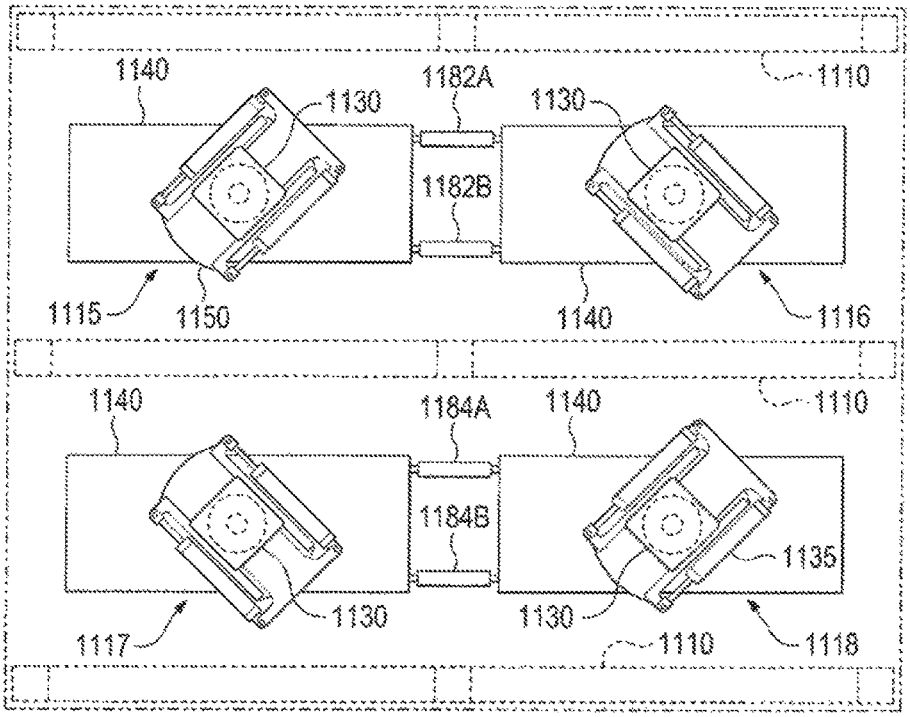
FIG. 11 is a top view of a load movement system according to embodiments of the invention.

FIG. 11 is a top view of a load movement system according to embodiments of the invention. Referring to FIG. 11, multiple load transporting apparatuses 1115, 1116, 1117, 1118 are used to move a load supported by a load-bearing frame 1110. Each of these load transporting apparatuses 1115, 1116, 1117, 1118 include a roller track 1150, a roller assembly 1130 that moves relative to the roller track, and a support foot 1140. Here, load transporting apparatuses that are in orientation-rows are connected with one or more biasing devices 1182, 1184. In particular, the support foot 1140 of a first load transporting apparatus 1115 is connected to the support foot of a second load transporting apparatus 1116 with two biasing devices 1182A and 1182B. These biasing devices 1182A, 1182B ensure that the first and second load transporting apparatuses 1115, 1116 are maintained in alignment with one another and the load-bearing frame 1110.

Here, the linking devices include a first linking device 1182A coupled between a first side of a first end of the first support foot 1140 and a first side of a first end of the second support foot 1140, and a second linking device 1182B coupled between a second side of the first end of the first support foot and a second side of the first end of the second support foot. The placement of the first and second linking devices 1182A, 1182B may ensure that the support feet 1140 are aligned together during a non-linear movement.

Similarly, the support foot 1140 of a third load transporting apparatus 1117 is connected to the support foot of a fourth load transporting apparatus 1118 with two biasing devices 1184A and 1184B. These biasing devices 1184A, 1184B ensure that the third and fourth load transporting apparatuses 1117, 1118 are maintained in alignment with one another and the load-bearing frame 1110.

Although FIG. 11 illustrates one example embodiment of biasing device connections that can maintain alignment of a support foot relative to a load-bearing frame, many different configuration variations exist. FIGS. 12A, 12B, 12C, 12D, and 12E are diagrams of walking apparatuses with various alignment restoration devices that illustrate some of these variations according to embodiments of the invention.

Figure 12A:
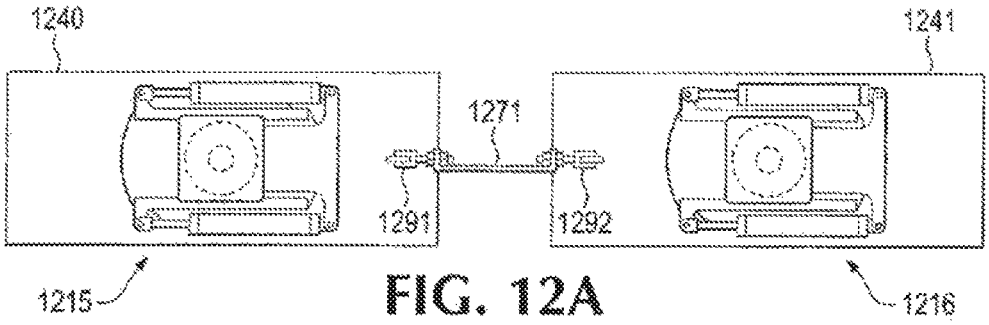
FIGS. 12A, 12B, 12C, 12D, and 12E are diagrams of walking apparatuses with various alignment restoration devices according to embodiments of the invention.

Referring to FIG. 12A, a linking device 1271 is connected between a first support foot 1240 of a first load transporting apparatus 1215 and a second support foot 1241 of a second load transporting apparatus 1216. The linking device 1271 may be attached to the first support foot 1240 with a first joint 1291, and may be attached to the second support foot 1241 with a second joint 1292. In some embodiments, the first and second joints 1291, 1292 may be ball joints that allow rotational movement. The linking device 1271 may be rigid rod, or may include a section of chain.

Figure 12B:
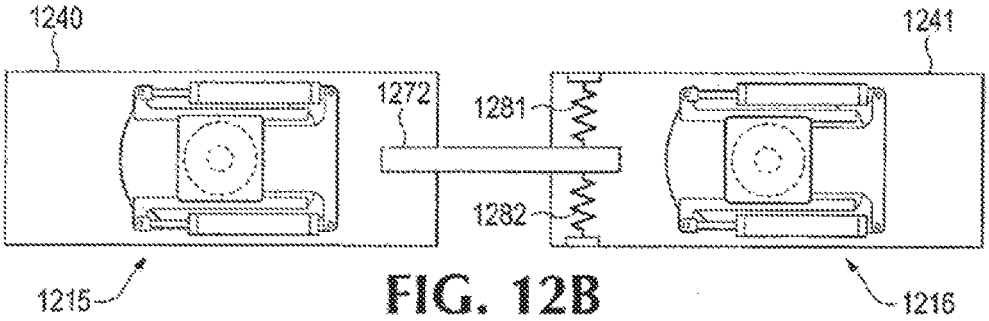

Referring to FIG. 12B, a linking device 1272 is connected between a first support foot 1240 of a first load transporting apparatus 1215 and a second support foot 1241 of a second load transporting apparatus 1216. The linking device 1272 may be rigidly attached to the first support foot 1240, but may be attached to the second support foot 1241 with a first biasing device 1281 and a second biasing device 1282. The first and second biasing devices 1281, 1282 may be placed on opposite sides of the linking device 1272 to provide a balanced system to return the support feet 1240, 1241 to uniform alignment after a non-linear movement.

Figure 12C:
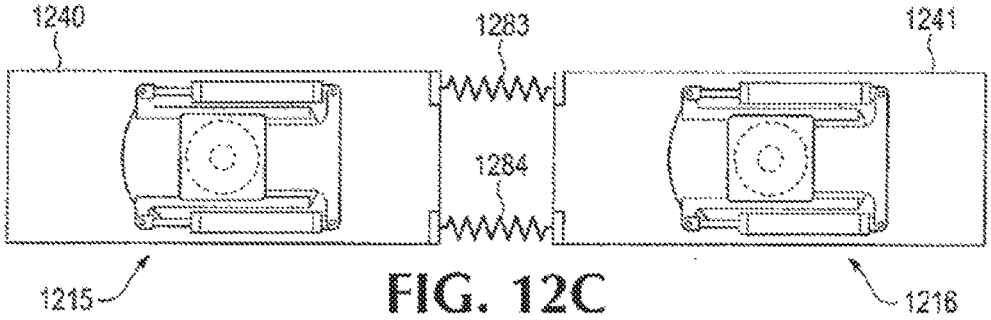

Referring to FIG. 12C, a first biasing device 1283 and a second biasing device 1284 are connected between a first support foot 1240 of a first load transporting apparatus 1215 and a second support foot 1241 of a second load transporting apparatus 1216. This embodiment may be similar to the shown in FIG. 11, except that the first and second biasing devices 1283, 1284 are specified as spring devices.

Figure 12D:
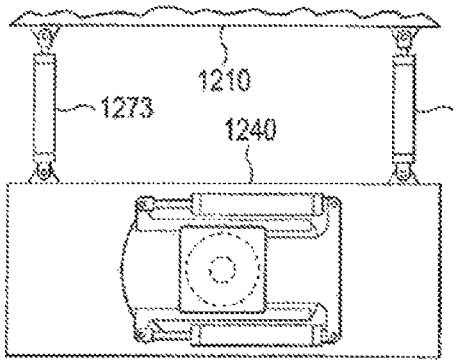

Referring to FIG. 12D, the support foot 1240 of a load transporting apparatus 1215 is connected to a load-bearing frame 1210 via a first linking cylinder 1273 and a second linking cylinder 1274. The first and second linking cylinders 1273, 1274 may be hydraulic cylinders that are activated during a recovery phase of a walking cycle to return the support foot 1240 to alignment with the load-bearing frame 1210. Alternatively, the first and second linking cylinders 1273, 1274 may be spring cylinders that automatically return the support foot 1240 to alignment with the load-bearing frame 1210 during a recovery phase of a walking cycle without additional operator input.

Figure 12E:
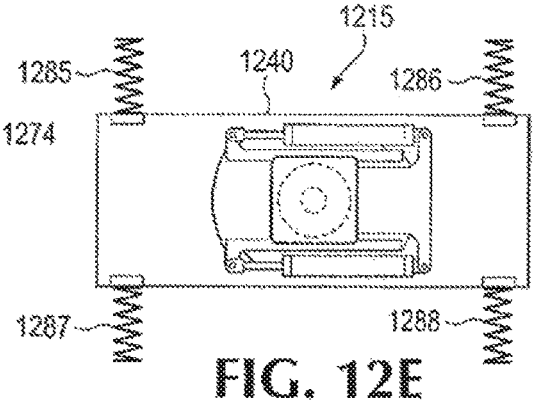

Referring to FIG. 12E, a support foot 1240 of a load transporting apparatus 1215 is connected at each corner to a biasing device 1285, 1286, 1287, 1288. These biasing devices 1285, 1286, 1287, 1288 may ensure that the support foot 1240 is maintained in alignment with a load-bearing frame during the recovery phase of a walking cycle by releasing potential energy stored during compression and/or elongation during non-linear movements.

Figure 13:
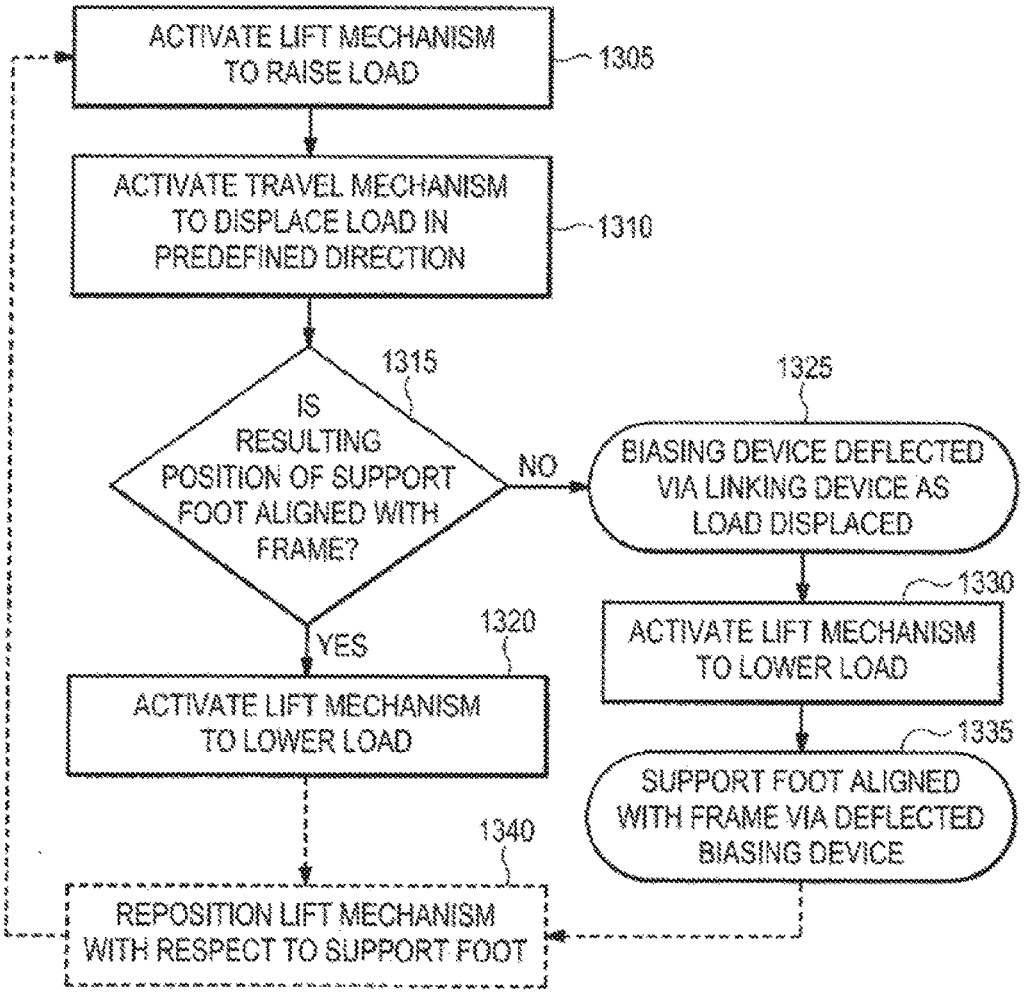
FIG. 13 is a flow diagram illustrating method of operating a load transporting apparatus according to embodiments of the invention.

FIG. 13 is a flow diagram illustrating method of operating a load transporting apparatus according to embodiments of the invention. In particular, the flow diagram of FIG. 13 illustrates a method of aligning a support foot of a load transporting device relative to a load-bearing frame during a load-transporting movement. The load transporting device includes a roller assembly coupled to a lift mechanism, a travel mechanism structured to displace the roller assembly relative to the support foot, one or more linking devices coupled to the support foot, and one or more biasing devices coupled to the linking devices.

Referring to FIG. 13, a flow begins at process 1305 where the lift mechanism is activated to lower the support foot to a ground surface and raising a load supported by the load-bearing frame. In process 1310, the travel mechanism is activated to displace the roller assembly connected to the lift mechanism relative to the support foot and ground surface, thereby moving a position of the load. Depending on the movement of the travel mechanism relative to the support foot, the position of the support foot may be aligned with the load-bearing frame or may not be aligned with the load-bearing frame. As discussed above, when the load is moved in a direction perpendicular to the orientation of the support foot, or moved parallel to the orientation of the support foot, the support foot typically remains aligned with the load-bearing-frame. If the load is moved in a different direction relative to the support foot, such as when the load is being steered in a non-linear path, the support foot can become misaligned with the load-bearing frame. In process 1315, it is observed whether the resulting position of the support foot is aligned with the load-bearing frame.

When the support foot remains aligned with the load-bearing frame, the flow proceeds to process 1320 where the lift mechanism is activated to lower the load and raise the support foot. However, when the support foot is not aligned with load-bearing frame, the biasing device is deflected via the linking device as the load is displaced as shown in step 1325. That is, the biasing devices are deflected when movement of the roller assembly results in an angular displacement between a centerline of the support foot and an orientation of the load-bearing frame. In process 1330, the lift mechanism is activated to lower the load and raise the support foot from the ground surface. As the support foot loses contact with the ground surface, the deflected biasing device acts on the support foot to align the support foot with the load-bearing frame, as shown in step 1335. That is, the centerline of the support foot is automatically aligned relative to the orientation of the load-bearing frame. After step 1335 or process 1320, the flow may include optional process 1340 where the lift mechanism is repositioned with respect to the support foot. If further walking steps are needed to move the load to a final position, the flow may return to process 1305 to initiate another walking cycle.

As described above, some embodiments of this invention are directed to a load transporting apparatus configured to move a load over a ground surface in one or more incremental steps each including a load-movement phase and a recovery phase. To move the load, the load transporting apparatus is coupled to a load-bearing frame configured to support the load. The load transporting apparatus includes a first support foot structured to interface with the ground surface, the first support foot having a length, width, and longitudinal centerline bisecting the width of the first support foot. The load transporting apparatus also includes a second support foot structured to interface with the ground surface, the second support foot also having a length, width, and longitudinal centerline bisecting the width of the second support foot.

First and second roller tracks are respectively coupled to the first support foot and second support foot via a first king pin connector and a second king pin connector. Additionally, first and second roller assemblies are respectively positioned on the first and second roller tracks. Each roller assembly includes a roller frame and one or more rollers set in the roller frame. First and second lift mechanisms are respectively coupled to the first and second roller assemblies. Each of the first and second lift mechanisms includes a lift cylinder connected to the load-bearing frame, and a cylinder rod, where each of the first and second lift mechanisms are structured to lift the load-bearing frame at the start of the load-movement phase.

The load transporting apparatus also includes first and second travel mechanisms respectively coupled to the first and second roller assemblies. Each of the travel mechanisms are structured to move the respective roller assembly relative to the respective support foot during the load-movement phase. A first linking device coupled to the first support foot, and a second linking device coupled to the second foot. A first biasing device is connected to the first linking device, where the first biasing device is structured to become activated during a load-movement phase when the first roller assembly is non-linearly displaced by the first travel mechanism relative to the first support foot, and structured to return the first support foot to an aligned position relative to the load-bearing frame during a recovery phase. A second biasing device is connected to the second linking device, where the second biasing device is structured to become activated during a load-movement phase when the second roller assembly is non-linearly displaced by the second travel mechanism relative to the second support foot, and structured to return the second support foot to an aligned position relative to the load-bearing frame during a recovery phase.

In some embodiments, the first linking device is coupled between the first support foot and the second support foot. In these embodiments, the second linking device is also coupled between the first support foot and the second support foot, as shown in FIG. 11, for example. In other embodiments, the first and second biasing devices are respectively coupled to the load-bearing frame, such as in FIG. 7A, for example.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. A load transporting apparatus comprising:

a support foot comprising a longitudinal centerline;

a roller assembly operably coupled to the support foot and configured to move relative to the support foot;

a lift mechanism operably coupled to the roller assembly and configured to lift [the] *a* load [transporting apparatus] *bearing frame* from a transport surface;

a travel mechanism operably coupled to the roller assembly and configured to non-linearly displace the support foot such that the longitudinal centerline of the support foot moves relative to a longitudinal centerline of the load [transporting apparatus] *bearing frame*; and one or more biasing devices configured to elastically and materially deform in response to the non-linear displacement of the support foot, wherein an elastic deformation of the one or more biasing devices provides a biasing force that operates to realign the support foot with the load [transporting apparatus] *bearing frame* such that the longitudinal centerline of the support foot becomes parallel with the longitudinal centerline of the load [transporting apparatus] *bearing frame* after the load [transporting apparatus] *bearing frame* is lowered to the transport surface.

2. The apparatus of claim 1, further comprising one or more linking devices operably coupling the support foot to the one or more biasing devices.

3. The apparatus of claim 2, wherein the biasing devices are further operably coupled to a load-bearing frame.

4. The apparatus of claim 2, wherein the one or more linking devices includes a first linking device attached at a first end of the support foot, and a second linking device connected to a second end of the support foot opposite of the first end of the support foot.

5. The apparatus of claim 4, wherein the one or more biasing devices include a torsion bar coupled between the first linking device and the second linking device.

6. The apparatus of claim 5, wherein the torsion bar is configured to undergo a torqueing force in response to the non-linearly displacement of the longitudinal centerline of the support foot relative to the longitudinal centerline of the load [transporting apparatus] *bearing frame*.

7. [An apparatus having a] *A* load transporting [device, a roller assembly, and a support foot, the] apparatus comprising:

*a roller assembly;*

*a support foot;* means for raising [the load transporting device] *a load bearing frame* from a transport surface;

means for moving the roller assembly relative to the support foot [of the load transporting device], wherein the roller assembly is operably coupled to the means for raising, and wherein the load [transport device] *bearing frame* moves in response to moving the roller assembly;

means for biasing; and means for deflecting the means for biasing in response to moving the roller assembly, wherein the movement of the roller assembly results in a non-linear displacement between a centerline of the support foot and a centerline of the load [transporting device] *bearing frame*, wherein the means for biasing is configured to elastically and materially deform in response to being deflected, and wherein an elastic deformation of the means for biasing devices provides a biasing force that operates to realign the centerline of the support foot relative to the centerline of the load [transporting device] *bearing frame* following the movement of the roller assembly.

8. The apparatus of claim 7, wherein the means for raising comprises means for raising the support foot from the transport surface, and wherein in response to raising the support foot, the means for biasing is configured to move the support foot relative to the load [transporting device] *bearing frame* such that the centerline of the support foot is realigned relative to the centerline of the load [transporting device] *bearing frame*.

9. The apparatus of claim 7, wherein the means for biasing is operably coupled to [a] *the* load-bearing frame.

10. The apparatus of claim 7, further comprising means for preventing activation of the means for biasing when the support foot is moved such that the centerline of the support foot is linearly displaced by the means for deflecting relative to the centerline of the load [transporting device] *bearing frame*.

11. The apparatus of claim 7, wherein the means for deflecting comprises means for linking the support foot to the means for biasing, and wherein the means for linking comprises:

first means for linking operably coupled at a first end of the support foot; and second means for linking operably coupled to a second end of the support foot.

12. The apparatus of claim 11, wherein the means for biasing comprises a torsion bar coupled between the first means for linking and the second means for linking.

13. The apparatus of claim 12, wherein the torsion bar is configured to undergo a torqueing force in response to the non-linearly displacement of the longitudinal centerline of the support foot relative to the longitudinal centerline of the load [transporting apparatus] *bearing frame*.

14. A method comprising:

raising, with a lift mechanism, a load [transporting device] *bearing frame* from a transport surface;

moving a roller assembly relative to a support foot [of the load transporting device], wherein the roller assembly is operably coupled to the lift mechanism, and wherein the load [transport device] *bearing frame* moves in response to moving the roller assembly;

angularly displacing a centerline of the support foot and a centerline of the load [transporting device] *bearing frame*;

deflecting one or more biasing devices in response to moving the roller assembly, wherein the one or more biasing devices are configured to elastically and materially deform in response to being deflected; and realigning the centerline of the support foot relative to the centerline of the load [transporting device] *bearing*

*frame* in response to a biasing force provided by an elastic deformation of the one or more deflected biasing devices.

15. The method of claim 14, further comprising lowering the support foot to the transport surface prior to raising the load [transporting device] *bearing frame*.

16. The method of claim 15, further comprising raising the support foot from the transport surface after moving the roller assembly relative to the support foot, wherein the centerline of the support foot is realigned relative to the centerline of the load [transporting device] *bearing frame* in response to raising the support foot.

17. The method of claim 14, wherein the one or more biasing devices comprise a torsion bar, and wherein deflecting the one or more biasing devices comprises applying a torque force to the torsion bar.

18. The method of claim 17, wherein realigning the centerline of the support foot comprises applying the torque force to the support foot via one or more linking devices operably coupling the support foot to the one or more biasing devices.

19. The method of claim 18, wherein the torsion bar is operably coupled between a first linking device and a second linking device of the one or more linking devices.

20. The method of claim 19, wherein the first linking device is operably coupled at a first end of the support foot, and wherein the second linking device is operably coupled to a second end of the support foot opposite of the first end.

*21. A load transporting apparatus comprising:*

*a support foot;*

*a roller assembly operably coupled to the support foot;*

*a lift mechanism operably coupled to the roller assembly and configured to lift a load bearing frame from a transport surface;*

*a travel mechanism configured to displace the support foot relative to the lift mechanism, wherein an activation of the travel mechanism operates to non-linearly displace the support foot relative to an orientation of the load bearing frame; and*

*one or more biasing devices configured to elastically and materially deform in response to the non-linear displacement of the support foot, wherein an elastic deformation of the one or more biasing devices provides a biasing force that operates to realign the support foot with the orientation of the load bearing frame.*

*22. The load transporting apparatus of claim 21, wherein the one or more biasing devices comprise a torsion bar substantially aligned with the orientation of the load bearing frame.*

*23. The load transporting apparatus of claim 21, further comprising one or more linking devices operably coupled to both the support foot and the one or more biasing devices.*

*24. The load transporting apparatus of claim 23, wherein the one or more linking devices comprise a first linking device operably coupled to a first end of the support foot, and a second linking device operably coupled to a second end of the support foot opposite the first end of the support foot.*

*25. The load transporting apparatus of claim 24, wherein the one or more biasing devices comprise a torsion bar operably coupled to both the first linking device and the second linking device.*

*26. The load transporting apparatus of claim 25, wherein the torsion bar is configured to undergo a torqueing force in response to the non-linearly displacement of the support foot relative to the orientation of the load bearing frame.*

*27. The load transporting apparatus of claim 21, wherein the one or more biasing devices are configured to elastically and materially deform when the support foot is in a lowered position on the transport surface, and wherein the biasing force operates to realign a centerline of the support foot with the orientation of the load bearing frame when the support foot is raised from the transport surface.*

*28. The load transporting apparatus of claim 27, wherein the one or more biasing devices are configured to elastically and materially deform with the load bearing frame raised above the transport surface, and wherein the biasing force operates to realign the centerline of the support foot with the orientation of the load bearing frame after the load bearing frame is lowered to the transport surface.*

* * * * *